(12) United States Patent
Kelley (10) Patent No.: US 7,114,423 B2
(45) Date of Patent: Oct. 3, 2006

(54) PIPE NOTCHER

(76) Inventor: Donald R. Kelley, 4255 Rio Monte Ct., Shasta Lake, CA (US) 96019

( * ) Notice: Subject to any disclaimer, the term of this patent is extended or adjusted under 35 U.S.C. 154(b) by 0 days.

(21) Appl. No.: 10/438,157

(22) Filed: May 13, 2003

(65) Prior Publication Data

US 2004/0226421 A1 Nov. 18, 2004

(51) Int. Cl.
*B26F 1/12* (2006.01)
(52) U.S. Cl. .............................. 83/191; 83/54; 83/917; 83/955
(58) Field of Classification Search ................ 83/955, 83/54, 191, 917, 178
See application file for complete search history.

(56) References Cited

U.S. PATENT DOCUMENTS

| | | | | |
|---|---|---|---|---|
| 402,381 A | * | 4/1889 | Aiken | ........................ 83/694 |
| 2,126,519 A | | 8/1938 | Vogel | |
| 2,765,648 A | * | 10/1956 | Bakula | ........................ 83/191 |
| 3,153,963 A | | 10/1964 | Coulon | |
| 3,180,196 A | | 4/1965 | Coulon | |
| 3,405,583 A | | 10/1968 | Herzog | |
| 3,410,168 A | * | 11/1968 | Feitshans | ...................... 83/588 |
| 4,283,978 A | | 8/1981 | Kasai | |
| 4,459,886 A | | 7/1984 | Belzil | |
| 4,646,601 A | * | 3/1987 | Borzym | ........................ 83/385 |
| 5,893,315 A | | 4/1999 | Miller | |
| 5,964,137 A | | 10/1999 | Jung | |
| 6,357,327 B1 | | 3/2002 | Usui | |

FOREIGN PATENT DOCUMENTS

| DE | 0129176 | * | 1/1978 |
|---|---|---|---|
| JP | 1-225413 | | 8/1989 |

OTHER PUBLICATIONS

Project Tool & Die, Inc.; catalog; Redding, California, undated, very poor photocopy.
Vogel Tool & Die Corporation; Tube & Pipe Fabricating Tools, Dies & Equipment; catalog; 2001; Stone Park, Illinois, poor photocopy.
Vogel Tool & Die Corporation; Tube Cutoff—Custom and Standard Machines and Automatic Feed and Discharge Equipment; brochure; Stone Park, Illinois, undated, poor photocopy.

* cited by examiner

*Primary Examiner*—Kenneth E. Peterson
(74) *Attorney, Agent, or Firm*—Heisler & Associates (57) ABSTRACT

A tool is provided for notching an end of a pipe. A punch is provided with a first cutting edge opposite a second cutting edge. The punch is coupled to a punch holder which is configured to move vertically relative to a collar supported upon a base. A pipe support provides a preferred form of die to hold the pipe adjacent the punch. The pipe support includes a first edge, second edge, third edge and fourth edge which can be selectively presented for supporting the end of the pipe adjacent the punch. The first cutting edge and second cutting edge of the punch can be selectively provided for cutting the notch in the pipe. The punch and pipe support are preferably both re-orientable to select various different edges for supporting and cutting the pipe.

16 Claims, 4 Drawing Sheets

PIPE NOTCHER

FIELD OF THE INVENTION

The following invention relates to tools for cutting notches in the ends of pipes. More particularly, this invention relates to die cutting tools configured to accurately, reliably and repeatably cut notches in the ends of pipes with a useful life including a high number of cycles.

BACKGROUND OF THE INVENTION

Pipes often require notches at ends thereof so that the pipes can be shaped to attach in a desired manner to adjacent structures. For instance, when the end of one pipe is to be welded to a midpoint of a second pipe, the end of one of the pipes is preferably notched in a semi-circular fashion with a radius of the notch similar to a radius of the second pipe to which the notched pipe end is to be attached. The notched end of the pipe is then ready for a welding procedure or other attachment procedure to connect the notched end of the pipe to the midpoint of the second pipe.

Tools exist in the prior art specifically designed to cut notches of various different shapes and sizes into the ends of pipes. For instance, the Vogel Tool and Die Corporation of West Chicago, Illinois provides various different notchers specifically to notch ends of pipe under the trademark "Arc-Fit."

Such prior art pipe notcher tools are effective in providing the desired notch into the end of a pipe. However, they suffer from numerous drawbacks. Specifically, prior art notchers include a punch which has a single cutting edge that does all of the pipe cutting. The life of this cutting edge is limited due to the high stresses associated with operation of the tool. Particularly when the tool is misused, damage to the cutting edge can occur, making the tool unfit for use until the punch is repaired or replaced. Even with proper use the cutting edge wears out over time, until repair or replacement is required.

Similarly, the prior art notchers include a die supporting the end of the pipe to be notched. This die includes an edge which can be damaged by misuse and which experiences significant stress, even during proper use. Over time this edge wears, becoming less effective in supporting the pipe during cutting with the punch. As with the cutting edge of the punch, once the edge of the die loses its desired contour, it must be either repaired or replaced.

Also, prior art notcher tools include a large punch which passes entirely through a holder. With such a large punch structure, a significant amount of material is lost when the punch is damaged beyond repair. Accordingly, a need exists for a pipe notcher which can achieve longer life from the various elements of the notcher tool, and particularly the punch and die, and which can continue to operate, even if the punch or die experience damage to cutting edges thereof.

SUMMARY OF THE INVENTION

This invention provides a pipe notcher tool which uniquely includes reversible cutting load bearing structures, such as the punch or the die, with multiple edges provided for cutting. In this way, when a first edge for cutting is damaged or becomes worn through excessive use, the reversible structure of the pipe notcher tool that supports the edge can be reversed to present a new edge for continued use of the tool. The reversible structures of the pipe notcher tool can be provided individually within the pipe notcher tool or together within the pipe notcher tool to maximize the reliability and useful life of the tool between necessary repair or replacement of cutting load bearing structures.

The pipe notcher tool preferably includes a base upon which other structures of the pipe notcher are supported. A collar is attached to the base and provides a slide in which a punch support can move vertically. A punch is supported by the punch holder with the punch properly positioned to cut the desired notch into the end of a pipe adjacent the punch. A die is provided to support the end of the pipe to be cut with the die preferably attached to the collar.

The punch includes a first cutting edge on a first side of the punch and a second cutting edge on a second side of the punch. The punch is reversible so that either the first cutting edge or the second cutting edge can be presented for cutting the pipe. The punch preferably does not extend entirely through the punch holder, but rather rests within a recess in a side of the punch holder facing the pipe when the pipe rests upon the die. Hence, the punch is significantly reduced in size, making shipping, handling and manufacture associated with the punch all simplified, and decreasing waste when the punch is replaced.

The die preferably is in the form of a pipe support including both a top saddle in a top surface of the die and a bottom saddle in a bottom surface of the die, with the saddles configured to support a pipe thereon having a contour for which the notcher is configured. Preferably, each saddle includes an edge thereon which coacts with one of the cutting edges of the punch to shear a coupon off of the end of the pipe and leave the desired notch in the end of the pipe.

The pipe support or other die is preferably both reversible and invertible so that four separate edges are presented for holding the pipe directly adjacent the cutting edge of the punch when the punch shears the coupon off of the end of the pipe. Alternatively, the die can be provided with a single top saddle and still provide a first edge and a second edge to coact with either the first cutting edge or the second cutting edge of the punch.

Hence, the edges involved in shearing the coupon off the end of the pipe and forming a notch in the end of the pipe, and which are most subject to wear or damage, are provided in multiples of at least two on reversible structures so that damage to one of the edges does not disable the tool. Rather, the structure having a damaged or worn edge is merely reversed or inverted to present a new edge for continued use of the tool. A user then has an opportunity to order replacement parts for the tool while the tool is still functioning effectively, increasing the overall usefulness of the tool.

OBJECTS OF THE INVENTION

Accordingly, a primary object of the present invention is to provide a pipe notcher tool which has a punch which includes both a first cutting edge and a second cutting edge and which is reversible relative to a punch holder, effectively doubling the life of the punch and the duty cycle of the notcher between punch repair or replacement.

Another object of the present invention is to provide a pipe notcher tool which includes a die for supporting an end of a pipe to be notched with the die having at least two edges thereon and the die configured to be reversible so that an effective life of the die is at least doubled.

Another object of the present invention is to provide a pipe notcher tool which includes a punch which does not pass entirely through a punch holder, but which merely resides within a recess facing a pipe to be cut.

Another object of the present invention is to provide a pipe notcher tool which is made of a modular construction including a punch separate from other structures within the tool and a die separate from other structures within the tool, so that damaged or worn portions of the tool can be removed for repair or replacement, or for reorientation to present a fresh edge for continued use, without disabling the tool.

Another object of the present invention is to provide a pipe notcher tool which has a longer useful life between repair or replacement of parts thereof.

Another object of the present invention is to provide a pipe notcher which is of rugged construction to withstand numerous cycles of operation before requiring repair or replacement of portions thereof.

Another object of the present invention is to provide a pipe notcher which can continue to operate even after cutting edges thereof are damaged.

Other further objects of the present invention will become apparent from a careful reading of the included drawing figures, the claims and detailed description of the invention.

DESCRIPTION OF THE PREFERRED EMBODIMENT

Referring to the drawings, wherein like reference numerals represent like parts throughout the various drawing figures, reference numeral 10 (FIG. 1) is directed to a pipe notcher tool for cutting a notch in an end of a pipe 2 (FIGS. 5 and 6) such as to facilitate attaching the end of the pipe 2 to other structures of various different shapes. The notcher 10 includes a reversible punch and reversible die so that multiple cutting edges are provided to enhance a useful life of the notcher 10.

Figure 1:
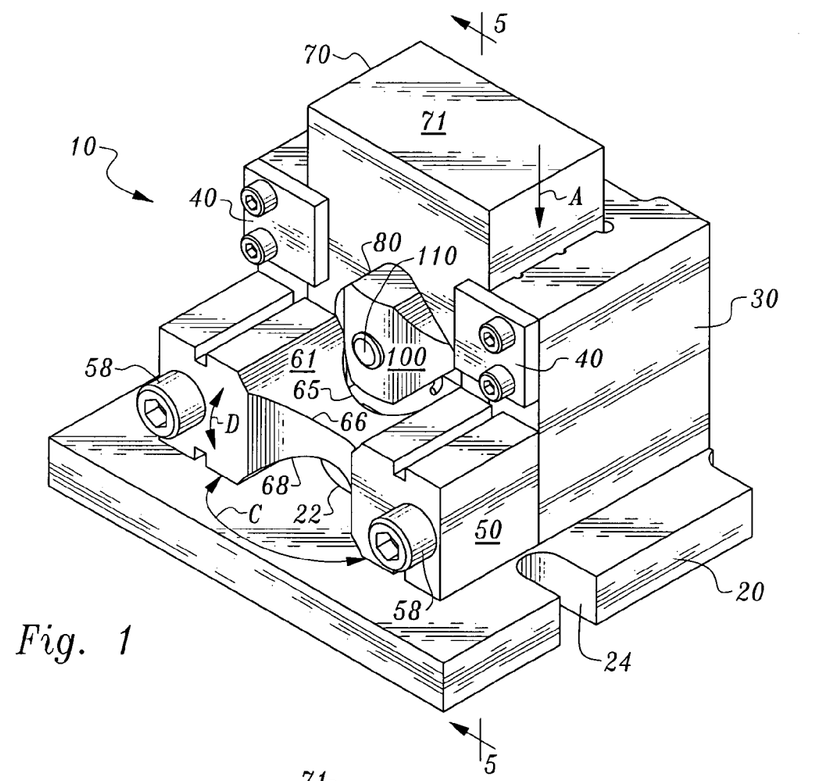
FIG. 1 is a perspective view of the pipe notcher tool of this invention with the punch and punch holder thereof in a first elevated position ready to receive an end of a pipe for notching thereof.
Figure 2:
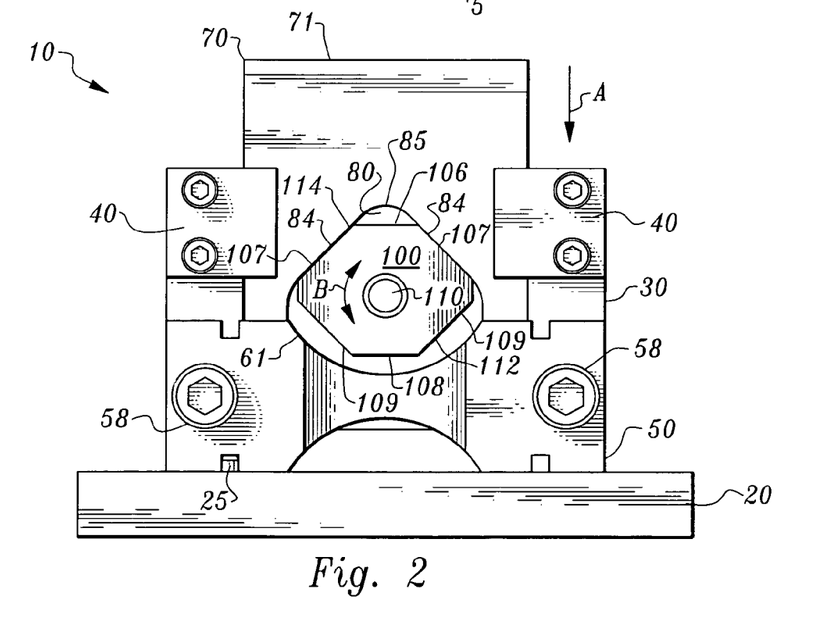
FIG. 2 is a front elevation view of that which is shown in FIG. 1.

In essence, and with particular reference to FIGS. 1 and 2, basic details of the notcher 10 are described. The notcher 10 is preferably formed as an assembly of various different structures attached together, such as with bolts. The notcher 10 preferably includes a base 20 which provides a surface to support other portions of the notcher 10. A collar 30 is bolted to the base 20 and acts as a preferred form of slide, allowing the punch 100 and associated punch holder 70 to move vertically relative to the collar 30 while restraining the punch 100 and punch holder 70 from lateral motion or rotation relative to the collar 30 and base 20. A die is provided, preferably in the form of a pipe support 50, that is removably attached to the collar 30 and includes a top saddle 61 for supporting the pipe 2 (FIG. 5) with a first edge 65 which acts along with the first cutting edge 112 of the punch 100 to shear a coupon 4 (FIG. 6) off of the end of the pipe 2, so that the pipe 2 is notched.

The punch holder 70 resides movably within the collar 30. Capture plates 40 attach to the collar 30 which hold the punch holder 70 within the collar 30. The punch holder 70 includes springs 77 between the punch holder 70 and the base 20 which bias the punch holder 70 in an elevated position ready to receive a pipe 2 to be notched. The punch holder 70 includes a recess 80 on a side thereof closest to the punch holder 50. The recess 80 is configured to support the punch 100 therein. A punch bolt 110 attaches the punch 100 to the punch holder 70 within the recess 80. The pipe support 50 and punch 100 are each reversible with multiple edges for shearing the coupon 4 off of the end of the pipe 2 to form the notch. Hence, when any such edge becomes damaged or excessively worn, it can be removed from adjacent structures and reoriented to present a new edge for cutting and allow continued operation of the notcher 10 with the new edge.

Figures 3, 4:
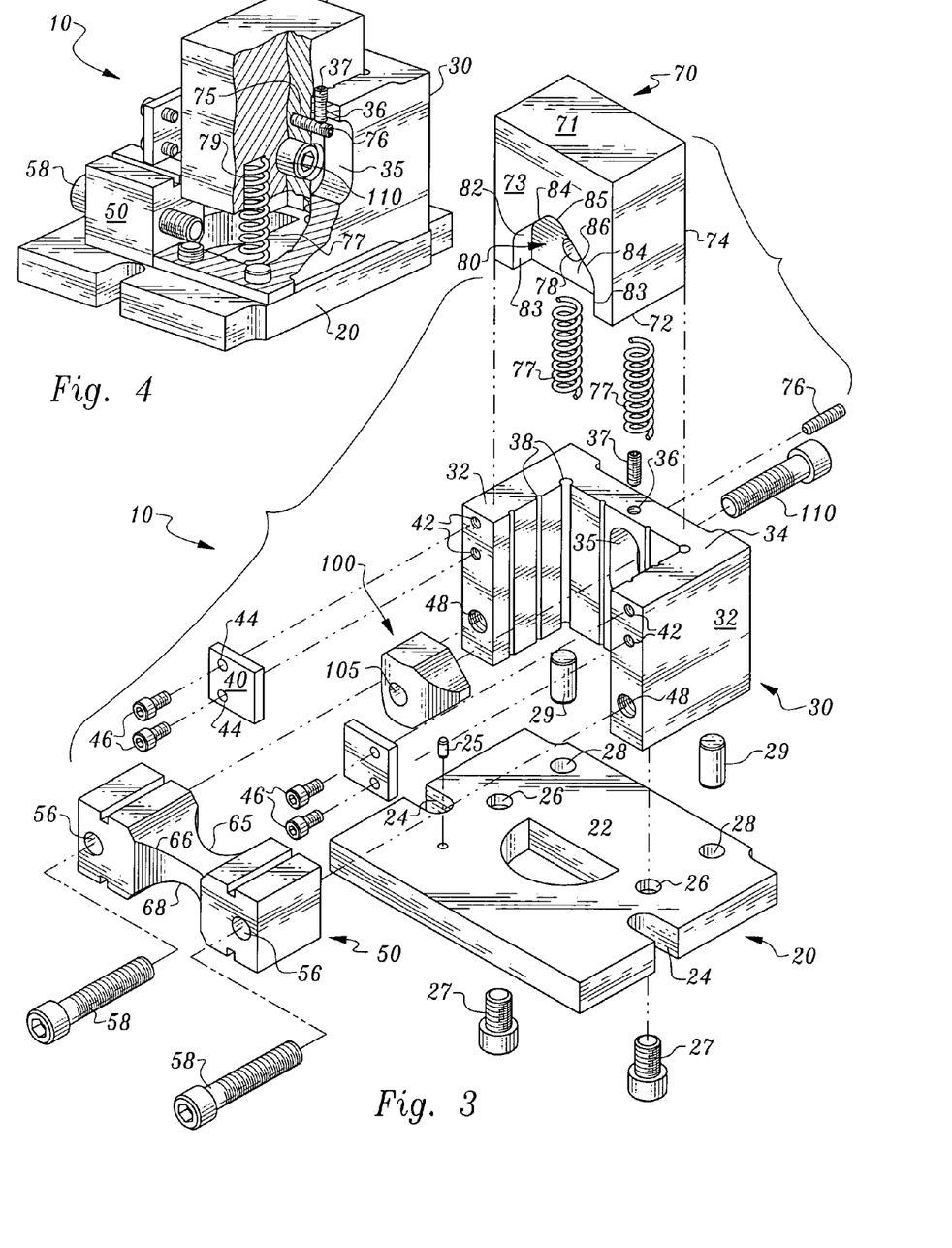
FIG. 3 is a perspective exploded parts view of that which is shown in FIG. 1.
FIG. 4 is a perspective view of that which is shown in FIG. 1 shown partially from the rear and with portions cut away to reveal interior details thereof.

More specifically, and with particular reference to FIG. 3, details of the base 20 are described. The base 20 is preferably provided to support other structures of the notcher 10. The base 20 could conceivably be omitted with remaining portions of the notcher 10 merely resting upon an appropriate horizontal surface. Preferably however, the base 20 is provided to provide a secure platform for holding the various different portions of the notcher 10 precisely where desired relative to each other.

The base 20 is preferably formed from a rigid steel or other metal material and is generally planar. A chute 22 passes through a middle of the base 20 to allow coupons 4 (FIG. 6) cut from pipes 2 by the notcher 10 to fall down away from the punch 100 and pipe support 50 to conveniently make the notcher 10 ready to cut another pipe 2. Slots 24 are preferably provided passing through the base 20 which can receive bolts or other fasteners to secure the base 20 to a horizontal surface such as a bench within a shop. An alignment pin 25 preferably extends up from a top surface of the base 20. The alignment pin 25 coacts with slots 62 (FIG. 11) in the pipe support 50 to assure that the pipe support 50 is properly aligned with the collar 30 and other structures upon the base 20.

The base 20 includes a pair of countersunk bores 26 configured to receive slide bolts 27 extending up through the countersunk bores 26 to secure the collar 30 to the base 20. Also, rear bores 28 pass down into a top surface of the base 20 and are sized to receive alignment posts 29 therein which also pass into the collar 30 to assist in properly aligning the collar 30 relative to the base 20.

With continuing reference to FIG. 3, details of the collar 30 are described. The collar 30 provides a preferred form of slide for supporting the punch holder 70 and punch 100 while the punch holder 70 and punch 100 move vertically along arrow A (FIG. 1). The collar 30 also preferably has the pipe support 50 or other die coupled thereto. The collar 30 of the preferred embodiment includes a pair of side walls 32 parallel and spaced from each other and joined together by a rear wall 34 perpendicular to the side walls 32. An opening 35 preferably passes through the rear wall 34. This opening 35 is preferably an oval in form with a long axis oriented vertically, and provides access to a punch bolt 110 as well as providing a location for a stop pin 37 and stop post 76 to act together to restrain a maximum extent of elevation of the punch holder 70, as described in detail below.

Figure 5:
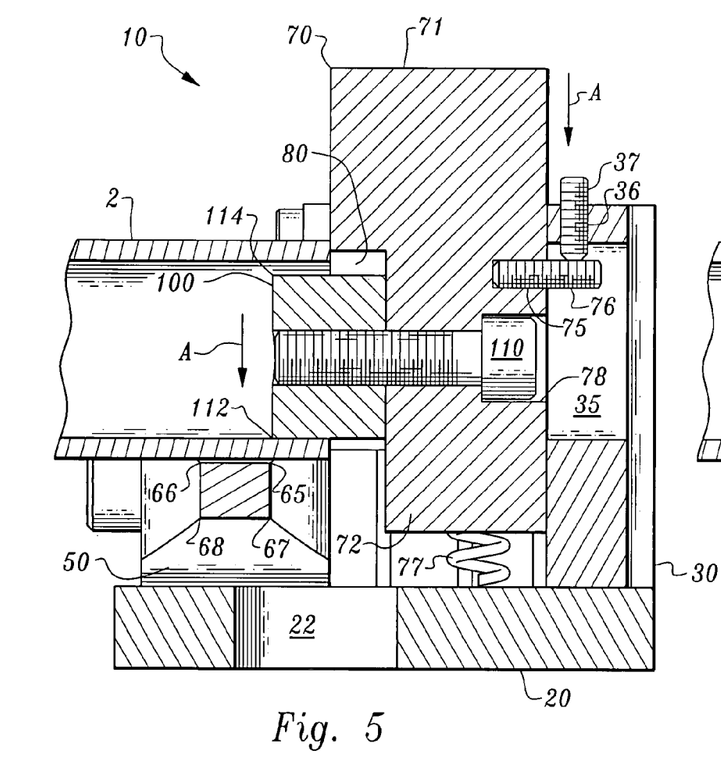
FIG. 5 is a side elevation full sectional view of that which is shown in FIG. 1 and with a pipe shown adjacent the punch and pipe support thereof immediately before cutting of a coupon off of the end of the pipe.

A threaded bore 36 passes vertically into the rear wall 34 into the opening 35. A threaded stop pin 37 threads into the threaded bore 36 and down into the opening 35 at least partially (FIGS. 3 and 5). The depth to which the stop pin 37 is threaded into and through the threaded bore 36 and into the opening 35 defines a maximum height of the punch holder 70.

Surfaces of the side walls 32 facing each other are adjacent surfaces of the punch holder 70 and act to restrain the punch holder 70 to only vertical translation relative to the collar 30, the pipe support 50 or other die, and the base 20. A forward surface of the rear wall 34 similarly acts to support a corresponding surface of the punch holder 70. Grooves 38 are preferably formed in these surfaces of the collar 30. These grooves 38 machine away ridges and inside corners of material remaining as an artifact of the milling process forming the collar 30. These grooves 38 thus help to ensure that the collar 30 can properly restrain the punch holder 70 to only vertical motion, without causing the punch holder 70 to bind within the collar 30.

Capture plates 40 are attached to the collar 30 to resist motion of the punch holder 70 horizontally away from the rear wall 34. Specifically, the capture plates 40 are attached through a pair of upper bores in each side wall 32 facing toward the pipe support 50 or other die structure of the notcher 10. The upper bores 42 are threaded to allow capture bolts 46 to be attached thereto after passing through capture holes 44 in the capture plates 40. Each capture plate 40 is sized to extend slightly toward each other and to partially face the rear wall 34, so that the collar 30 along with the capture plates 40 can at least partially surround the punch holder 70.

Below the upper bores 42 are a pair of lower bores 48 extending into the side walls 32. The lower bores 48 are threaded to allow appropriate fasteners to secure the pipe support 50 or other die structure directly to this surface of the collar 30 where the lower bores 48 are provided.

The collar 30 provides a preferred form of slide which acts as a preferred form of means to slidably support the punch holder 70. Other alternative slidable support means could be provided including vertical plates with guide slots therein, pivoting linkages joining the punch holder 70 to the pipe support 50 or other die, or other structures capable of supporting the punch holder 70 in vertical motion relative to the die and pipe 2 being cut.

With particular reference to FIGS. 1, 2 and 11–13, particular details of the pipe support 50 are described. The pipe support 50 provides a preferred form of die for the notcher 10 of this invention and a preferred form of a means to hold the pipe 2 relative to the collar 30 or other slide or slidable support means. Other structures could similarly be provided to hold the pipe 2 adjacent where the punch 100 strikes and cuts the pipe 2. The pipe support 50 is preferably a rigid construct formed from a unitary mass of metal or other strong rigid material. The pipe support 50 includes a bottom surface 52 of generally planar form parallel with and spaced from a planar top surface 54. Attachment bores 56 pass entirely through the pipe support 50 preferably at a midpoint between the bottom surface 52 and top surface 54 in a horizontal fashion. Attachment bolts 58 are sized to pass through the attachment bores 56 and thread into the lower bores 48 of the collar 30. The attachment bores 56 are spaced from sides of the pipe support 50 a similar distance so that the pipe support 50 is effectively reversible and invertible about both arrows C and D of FIG. 1.

Figure 11:
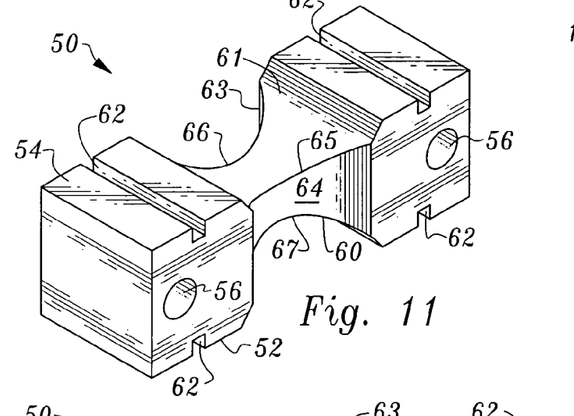
FIG. 11 is a perspective view of the die of this invention shown above.
Figure 12:
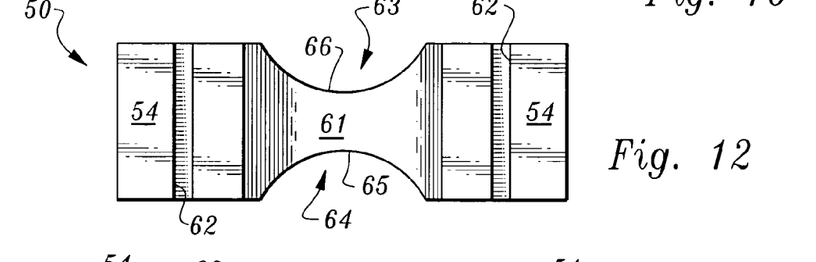
FIG. 12 is a top plan view of the die of FIG. 11.
Figure 13:
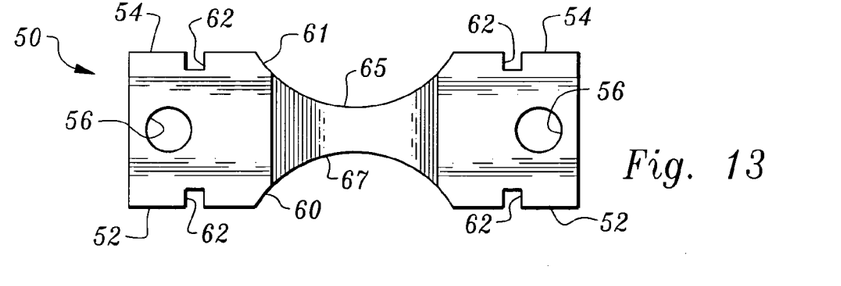
FIG. 13 is a front elevation view of the die of FIG. 11.

The pipe support 50 preferably includes both a bottom saddle 60 in the bottom surface 52 and a top saddle 61 in the top surface 54. By having two saddles 60, 61 the pipe support 50 is invertible. A pair of slots 62 are provided in the bottom surface 52 and a pair of slots 62 are provided in the top surface 54. The slots 62 slide along the alignment pin 25 and the base 20 to assist in properly aligning the pipe support 50 for attachment to the collar 30 upon the base 20.

The pipe support 50 includes a front clearance arc 63 and a rear clearance arc 64. Clearance arcs 63, 64 are on opposite sides of the pipe support 50. The clearance arcs 63, 64 are shaped to match a desired contour for the notch to be formed in the end of the pipe 2 (FIG. 5).

A first edge 65 is provided at a junction of the top saddle 61 and rear clearance arc 64. A second edge 66 is provided at a junction between the top saddle 61 and a front clearance arc 63. A third edge 67 is provided between the bottom saddle 60 and the rear clearance arc 64 and a fourth edge 68 is provided at a junction between the bottom saddle 60 and the front clearance arc 63. Each of the edges 65, 66, 67, 68 can interchangeably function as the portion of the pipe support 50 acting as a die along with the punch 100 and its cutting edges 112, 114 (FIGS. 7–10) to shear a coupon 4 off of an end of the pipe 2 with the notcher 10.

While the pipe support 50 preferably includes four separate edges 65, 66, 67, 68 for cutting, the benefits of this invention can largely be provided by a pipe support 50 having only the top saddle 61 and only the first edge 65 and second edge 66. With such an alternative pipe support 50, the pipe support 50 is reversible, but not invertible and has two separate wear surfaces. With the pipe support 50 according to the preferred embodiment, four separate wear edges 65, 66, 67, 68 are provided and the pipe support 50 is both reversible an invertible, to essentially provide four times the useful life for the notcher 10 before the pipe support 50 requires replacement or repair. Also, while not preferred this invention can be practiced with only the pipe support 50 or other die being reversible, and without a reversible punch 100 or vice versa.

With particular reference to FIG. 3, details of the punch holder 70 are described. The punch holder 70 is a rigid unitary mass which moves relative to other portions of the notcher 10 and holds the punch 100, guiding the punch as it cuts through the end of the pipe 2. The punch holder 70 is generally rectangular with a planar top 71 parallel with a planar bottom 72. A planar front 73 extends perpendicularly from the top 71 to the bottom 72. A planar rear 74 extends from the top 71 to the bottom 74 parallel with the front 73.

A pair of spring bores 79 extend vertically up into the bottom 72. The spring bores 79 are sized to receive springs 77 therein with portions of each spring 77 extending below the bottom 72 and coming into contact with the base 20. The spring 77 bias the punch holder 70 in an elevated position above the base 20, unless sufficient force is provided to overcome the spring force provided by the springs 77 to cause the punch holder 70 to travel downward (along arrow A of FIGS. 1, 2, 5 and 6).

The elevated position of the punch holder 70 is defined by a position where a stop post 76 abuts the stop pin 37 of the collar 30. Specifically, the stop post 76 is a threaded post that is threaded into a blind bore 75 extending horizontally into the rear 74 of the punch holder 70. The stop post 76 extends out of the rear 74 within the opening 35 and below the stop pin 37 of the collar 30. When the stop post 76 abuts the stop pin 37, the maximum height of the punch holder 70 is provided. By rotating the stop pin 37, this maximum height of the punch holder 70 can be adjusted.

A shouldered bore 78 passes entirely through the punch holder 70 with the shoulder provided closest to the rear 74. The shouldered bore 78 allows the punch bolt 110 to pass therethrough with a head of the punch bolt 110 nested within the punch holder 70 between the shoulder of the shouldered bore 78 and the rear 74.

The front 73 of the punch holder 70 includes a recess 80 therein particularly configured to hold the punch 100 therein. Recess 80 has an uppermost portion defined by an arch 82 in the form of a surface perpendicular to other portions of the front 73. The arch 82 includes planar vertical sides 83 at lowermost portions of the recess 80. Above the sides 83 a pair of diagonal slopes 84 extend up to an apex 85 defining an uppermost portion of the arch 82. The recess 80 includes a wall 86 below the arch 82 which is parallel with other portions of the front 73 of the punch holder 70. The wall 86 is recessed deeper into the punch holder 70 than the front 73.

The depth of the recess 80 is preferably approximately half of a thickness of the punch 100. Thus, a significant portion of the punch 100 is located below the arch 82 when the punch 100 is within the recess 80 and coupled to the punch holder 70. The contour of the arch 82, and particularly the diagonal slopes 84 are particularly provided to both properly position the punch 100 and effectively transfer vertical loads from the punch holder 70 to the punch 100.

The punch holder 70 provides a preferred form of a means to hold the punch 100 preferably in two distinct orientations. Other structures could similarly be provided to hold the punch 100 such as clamps or other structures to capture the punch 100 and deliver loads to the punch 100.

With particular reference to FIGS. 1, 2 and 7–10, details of the punch 100 are described. The punch 100 provides a preferred form of cutting tool attachable to the punch holder 70 to actually cut the coupon 4 from the end of the pipe 2 with the notcher 10. Alternatively, the punch 100 can be formed together with the punch holder 70, with such an alternative only having a reversible die and not a reversible punch, or the entire combined punch and punch holder could be made reversible.

Figure 6:
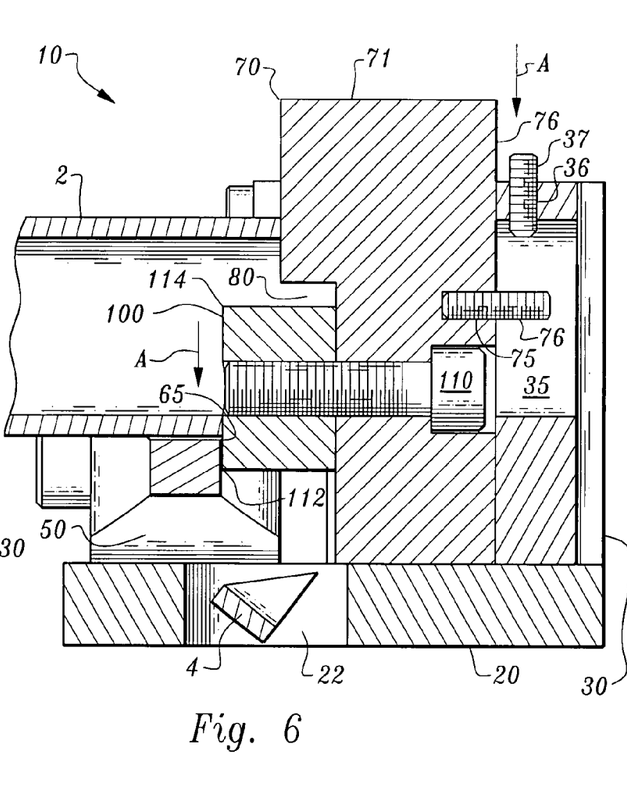
FIG. 6 is a side elevation full sectional view of that which is shown in FIG. 1 and similar to FIG. 5 except that the punch and punch holder have moved to a lower position and the coupon has been sheared from the end of the pipe so that the pipe has been notched.
Figure 7:
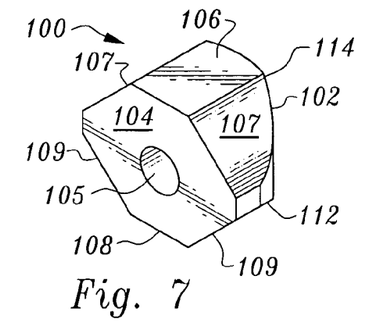
FIG. 7 is a perspective view of the punch of this invention shown alone.
Figure 8:
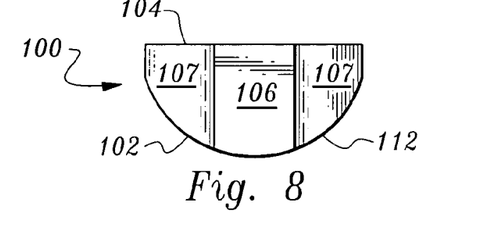
FIG. 8 is a top plan view of the punch of FIG. 7.
Figure 9:
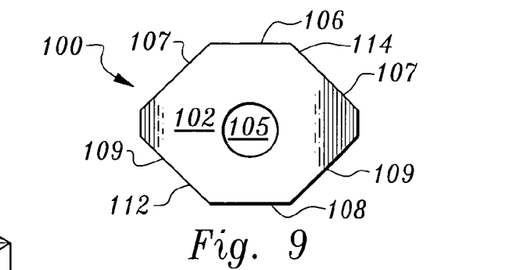
FIG. 9 is a front elevation view of the punch of FIG. 7.
Figure 10:
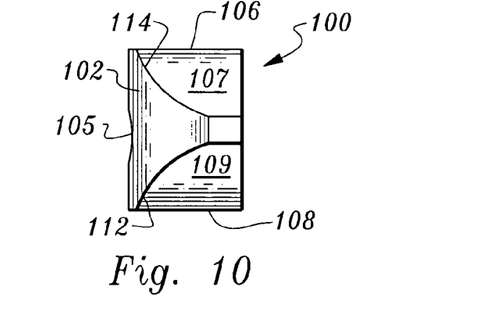
FIG. 10 is a side elevation view of the punch of FIG. 7.

The punch 100 preferably includes a front curving surface 102 opposite a flat surface 104. The curving surface 102 has a contour matching a desired contour for the coupon 4 to be cut from the end of the pipe 2 (FIG. 6). This curving surface 102 matches a curve of the front clearance arc 63 and rear clearance arc 64 of the saddles 60, 61 of the pipe support 50.

A central hole 105 passes through the punch 100 perpendicular to the curving surface 102 and the flat surface 104. The central hole 105 is preferably at a vertical midpoint of the punch 100, facilitating reversibility of the punch 100 as discussed in detail below. The central hole 105 is threaded with threads configured to match threads of the punch bolt 110. The punch bolt 110 can thus pass through the shouldered bore 78 and the punch holder 70 and thread into the central hole 105 to hold the punch 100 within the recess 80 and adjacent the punch holder 70. The punch bolt 110 preferably does not deliver or support significant vertical loads on the punch 100 during operation of the notcher 10. Rather, the punch bolt 110 merely holds the punch 100 in place within the recess 80 of the punch holder 70.

The punch 100 additionally includes a top flat 106 which is preferably oriented substantially horizontal. Angled facets 107 extend diagonally downward from the top flat 106. A bottom flat 108 is provided at a bottom of the punch 100 which preferably mirrors in configuration the top flat 106 with the bottom flat 108 parallel with the top flat 106. Angled facets 109 extend diagonally from the bottom flat 108 in a fashion which mirrors that of the angled facets 107 about a central horizontal plane bisecting the punch 100. The punch 100 is thus preferably bilaterally symmetrical about this horizontal central plane of the punch 100. Accordingly, the punch 100 can be reversed by rotation about a horizontal axis passing through the central hole 105 (about arrow B of FIG. 2) such that the top flat 106 and bottom flat 108 are interchangeable and the angled facets 107 are interchangeable with the angled facets 109.

The punch 100 includes a first cutting edge 112 defined by a junction between the curving surface 102 and the bottom flat 108 and the angled facets 109. The punch 100 additionally includes a second cutting edge 114 defined by an intersection between the curving surface 102 and the top flat 106 and angled facets 107. Depending on the orientation of the punch 100, one of the cutting edges 112, 114 faces generally downward and in proper position for cutting the coupon 4 from the end of the pipe 2 (FIG. 6) with the notcher 10.

While the flats 106, 108 and the facets 107, 109 are each preferably planar, these surfaces of the punch 100 are most importantly provided with any geometry which matches that of the arch 82 of the recess 80 in the punch holder 70. In this way, the punch 100 has surfaces on an uppermost portion of the punch 100 which securely contact the arch 82 of the recess 80 of the punch holder 70. The significant loads to be transferred between the punch holder 70 and the punch 100 during cutting of the pipe 2 are thus transferred over a large surface area to minimize strain on the punch holder 70 and the punch 100 during use.

By preferably providing the angled facets 107, 109 with a planar form, and by providing the diagonal slopes 84 of the arch 82 of the recess 80 with a planar form of similar angle, the punch 100 is self centering. Specifically, if the punch 100 is slightly misaligned to the left or the right, when loads are applied between the punch holder 70 through the arch 82 to the punch 100, the diagonal slopes 84 and angled facets 107 interact to cause the punch 100 to be precisely centered within the recess 80. The punch 100 is thus always precisely aligned for properly cutting the pipe 2. Preferably, the top flat 106 and bottom flat 108 truncate upper and lower surfaces of the punch 100 so that these flats 106, 108 do not come into contact with the arch 82 of the recess 80. Rather, the apex 85 and arch 82 are preferably curved so that a gap is provided between the apex 85 of the arch 82 and the flat 106, 108 on an upper portion of the punch 100.

Preferably, the punch bolt 110 and central hole 105 have threads which have a significant degree of tolerance therebetween. This tolerance allows the punch 100 to move laterally slightly if necessary to allow the facets 107, 109 to properly engage the diagonal slopes 84 of the arch 82 for transfer of vertical loads between the punch holder 70 and the punch 100 without putting these loads on the bolt 110.

With particular reference to FIGS. 1, 2, 5 and 6 details of the use and operation of the notcher 10 of this invention are described. Initially, the notcher 10 is provided with the various different structures described above. These structures are appropriately assembled as described above and as shown in the included drawing figures. The springs 77 initially cause the punch holder 70 and punch 100 to be in an elevated first position defined by a position of the stop pin 37 of the collar 30. If necessary, the stop pin 37 is rotated until the punch holder 70 and punch 100 have a desired elevation for this starting position.

A pipe 2 to have its end notched is then placed upon the pipe support 80 as shown in FIG. 5. The punch 100 is sized to fit within an interior of the pipe 2 and to extend to a depth of the coupon 4 to be cut from the pipe 2.

A load is then placed downward on the top 71 of the punch holder 70 (or otherwise transferred to the punch holder 70) driving the punch holder 70 and punch 100 downward, along arrow A (FIGS. 5 and 6) and compressing the springs 77 until the bottom 72 of the punch holder 70 comes into contact with the base 20. As the punch holder 70 moves downward, the first cutting edge 112 of the punch 100 comes into contact with the end of the pipe 2 and shears the coupon 4 from the end of the pipe 2. A first edge 65 of the top saddle 61 of the pipe support 50 supports the pipe 2 directly adjacent where the notch is cut.

The coupon 4, once severed, falls down into the chute 22 in the base 20. Preferably, this chute 22 is located over a container sufficiently large to allow the coupons 4 to be collected away from the notcher 10 to avoid jamming of the notcher 10 with coupons 4. The springs 77 then cause the punch holder 70 and punch 100 to be re-elevated to the first position. The notcher 10 is then ready for repeated use in notching another pipe 2.

Over time the first cutting edge 112 of the punch 100 and the first edge 65 of the top saddle 61 of the pipe support 50 will experience wear. Additionally, misuse of the notcher 10 can cause the first cutting edge 112 or the first edge 65 to become damaged. When such wear or damage occurs, the notcher 10 is not disabled. Rather, when the first cutting edge 112 of the punch 100 becomes damaged or worn, the punch bolt 112 is removed from the central hole 105 of the punch 100 and the punch 100 is rotated 180° (about arrow B of FIG. 2) to present the second cutting edge 112 in a downwardly facing direction. The punch bolt 110 is then repositioned within the central hole 105 and the punch 100 is rejoined to the punch holder 70. The fresh second cutting edge 114 is now available for continued use of the notcher 10.

In the meantime, a replacement punch 100 can be ordered or arrangements made for the repair of the punch 100 when the notcher 10 is next scheduled for maintenance. The notcher 10 thus is not disabled by such wear or damage but can continue to be used by the operator. When the second cutting edge 114 becomes worn or damaged, the punch 100 can be removed for repair or replacement. Because the punch 100 is only a small portion of the overall notcher 10, the cost and expense associated with shipping replacement punches 100 and in stocking replacement punches 100 is kept to a minimum.

Similarly, when the first edge 65 of the top saddle 61 of the punch support 50 becomes worn or damaged, the notcher 10 is not disabled. Rather, the attachment bolts 58 of the pipe support 50 are loosened and the pipe support 50 is rotated (about arrow C of FIG. 1) so that the second edge 66 is presented adjacent the punch 100 for supporting the pipe 2 during cutting with the notcher 10.

In an alternative form of the invention, a pipe support can be provided with only a single saddle and with the first edge 65 and the second edge 66 only. Preferably however, the pipe support 50 also includes a bottom saddle 60 with a third edge 67 and fourth edge 68. In this preferred form of pipe support 50, when the second edge 66 becomes worn or damaged, the pipe support 50 can be removed from other portions of the notcher 10 and inverted (about arrow D of FIG. 1) to present the bottom saddle 60 in an upwardly facing direction and presenting the third edge 67 adjacent the punch 100. When this third edge 67 becomes worn or damaged, the pipe support 50 can be rotated (about arrow C of FIG. 1) so that the bottom saddle 60 is still facing upwards and presenting the fourth edge 68 adjacent the punch 100. The preferred pipe support 50 thus provides four separate edges for supporting the pipe 2 adjacent the punch 100 during cutting with the notcher 10.

While the punch 100 preferably includes a flat surface 104 opposite the curving surface 102 which abuts against the flat wall 86 of the recess 80 within the punch holder 70, it is conceivable that this flat surface 104 could alternatively be a curving surface similar to the curving surface 102 of the punch 100. The wall 86 of the recess 80 can be replaced with a curving wall matching that of the alternative curving surface opposite the curving surface 102 of the punch 100. With such an arrangement, four cutting edges could be provided on the punch 100 so that the punch 100 could also be not only rotated but inverted in a front to back fashion so that four separate edges would be provided for cutting with the punch 100. The notcher 10 is thus provided in a form that is very reliable in operation with wear or damage to the cutting edges 112, 114 or the edges 65, 66, 67, 68 not disabling the notcher 10, but rather merely requiring rotation of or inversion of the appropriate structure supporting the worn or damaged edge so that the notcher 10 can continue to operate.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion, unless specifically restricted.

What is claimed is:

1. A tool for cutting a notch in a pipe, the tool comprising in combination:
   a die adapted to support a pipe to be cut;
   a slide coupled to said die;
   a punch holder adapted to abut said slide and move relative to said slide;
   a punch coupled to said punch holder;
   said punch having a first cutting edge on a first side of said punch, said first cutting edge adapted to face downwardly and cut a pipe supported by said die when said punch is in a first orientation, said first cutting edge including lateral cutting portions located above central cutting portions of said first cutting edge;
   a second cutting edge on a second side of said punch spaced from said first side, said second cutting edge adapted to face downwardly and cut a pipe supported by said die when said punch is in a second orientation, said second cutting edge including lateral cutting portions located below central cutting portions of said second cutting edge;

said punch adapted to be rotated relative to said punch holder between said first orientation and said second orientation, such that said first cutting edge rotates from facing downwardly to facing upwardly and said second cutting edge rotates from facing upwardly to facing downwardly; and said punch holder including a pair of flat diagonal slopes extending down from opposite sides of an apex, said diagonal slopes and said apex together forming an arch, said pair of flat diagonal slopes of said arch adapted to contact said punch adjacent an upwardly facing one of said first cutting edge and said second cutting edge of said punch, said lateral cutting portions of said first and second cutting edges each are an angled facet that is generally coplanar with respective said diagonal slopes of said punch holder when facing upwardly and abutting said diagonal slopes.

2. The tool of claim 1 wherein said slide is fixed to said die.

3. The tool of claim 1 wherein said slide includes a collar, said
collar including side walls spaced from each other by a distance similar to a width of said punch holder.

4. The tool of claim 3 wherein said collar includes a rear wall extending between said side walls, said side walls oriented parallel with each other and said rear wall oriented perpendicular to each of said side walls, said die coupled to a side of said collar opposite said rear wall with a distance from said die to said rear wall similar to a depth of said punch and said punch holder, such that said punch is located adjacent said die when said punch holder is located between said side walls of said collar and adjacent said rear wall of said collar.

5. The tool of claim 4 wherein at least one spring is located adjacent said punch holder at a first end of said spring and a base at a second end of said spring, said base removably attached to said collar beneath said collar, said spring oriented to bias said punch holder in a first position most distant from said base and supporting said punch above the pipe to be cut; and
said punch holder and said slide including an adjustable stop pin and a stop post which coact together to define a maximum distance said spring can move said punch away from said base.

6. The tool of claim 1 wherein said punch holder includes a recess including an arched surface defined by said arch and having a contour matching a contour of portions of both said first cutting edge of said punch and said second cutting edge of said punch, such that said arched surface is adapted to abut said second cutting edge when said first cutting edge is oriented for cutting the pipe and said arched surface is adapted to abut said first cutting edge when said second cutting edge of said punch is oriented for cutting the pipe.

7. The tool of claim 6
wherein said angled facets of said punch are each spaced apart by either a top flat on said punch or a bottom flat on said punch, said flats joining each said angled facets together, said top flat located spaced below said apex by a gap when said angled facets adjacent said top flat are located abutting said diagonal slopes of said arched surface; and
wherein a width of said punch is less than a width of said recess in said punch holder, such that side gaps are provided between sides of said recess in said punch holder below said diagonal slopes of said recess and sides of said punch.

8. A tool for cutting a notch in a pipe, the tool comprising in combination:
a die adapted to support a pipe to be cut;
a slide coupled to said die;
a punch holder adapted to abut said slide and move relative to said slide;
a punch coupled to said punch holder;
said punch having a first cutting edge on a first side of said punch, said first cutting edge adapted to face downwardly and cut a pipe supported by said die when said punch is in a first orientation, said first cutting edge including lateral cutting portions located above central cutting portions of said first cutting edge;
a second cutting edge on a second side of said punch spaced from said first side, said second cutting edge adapted to face downwardly and cut a pipe supported by said die when said punch is in a second orientation, said second cutting edge including lateral cutting portions located below central cutting portions of said second cutting edge;
said punch adapted to be rotated relative to said punch holder between said first orientation and said second orientation;
said punch positionable within a circumference matching an arcuate surface formed in an upper surface of said die; and
wherein said punch holder includes a recess including an arched surface facing downward and having a contour matching a contour of portions of said upper surface of said punch, said arched surface including a pair of flat diagonal slopes extending down from opposite sides of an apex, said pair of flat diagonal slopes of said arched surface adapted to contact said punch adjacent an upwardly facing one of said first cutting edge and said second cutting edge, said lateral cutting portions of said first and second cutting edges each are an angled facet that is generally coplanar with respective said diagonal slopes of said punch holder when facing upwardly and abutting said diagonal slopes.

9. The tool of claim 8
wherein said angled facets of said punch are each spaced apart by a top flat on said punch, said top flat joining said angled facets together, said top located spaced below said apex by a gap when said angled facets adjacent said top flat are located abutting said diagonal slopes of said arched surface; and
wherein a width of said punch is less than a width of said recess in said punch holder, such that side gaps are provided between sides of said recess in said punch holder below said diagonal slopes of said recess and sides of said punch.

10. The tool of claim 9 wherein said punch holder includes a bore passing therethrough and said punch includes a threaded central hole passing therethrough; and
wherein a punch bolt is provided sized to pass through said bore in said punch holder and through said threaded central hole of said punch with said punch bolt engaging threads within said threaded central hole to allow said punch bolt to attach said punch to said punch holder.

11. The tool of claim 10 wherein said bore in said punch holder is a shouldered bore with a shoulder therein sufficiently distant from a surface of said punch holder opposite said punch to allow a head of said bolt to be entirely recessed within an outline of said punch holder, said threads of said threaded central hole and said threads of said punch bolt having sufficient tolerance therebetween to allow said facets of said punch abutting said diagonal slopes of said arched surface of said recess to fully engage each other without necessitating precise positioning of said threaded central hole of said punch at a precise center of said punch and precise positioning of said shouldered bore within said punch holder.

12. The tool of claim 8 wherein said recess includes a flat wall perpendicular to said arched surface; and wherein said punch includes at least one flat surface perpendicular to said angled facets, said flat surface of said punch adapted to abut said flat wall of said recess.

13. A tool for cutting a notch in a pipe, the tool comprising in combination:

a punch having a first cutting edge and a second cutting edge spaced from said first cutting edge;

said first cutting edge including lateral cutting portions located above central cutting portions of said first cutting edge;

said second cutting edge including lateral cutting portions located below central cutting portions of said second cutting edge;

a punch holder, said punch holder including means to hold said punch in two distinct orientations for cutting the pipe with either said first cutting edge or said second cutting edge;

said punch holder including a pair of flat diagonal slopes extending down from opposite sides of an apex, said diagonal slopes and said apex together forming an arch, said pair of diagonal slopes of said arch adapted to contact said punch adjacent an upwardly facing one of said first cutting edge and said second cutting edge;

a means to slidably support said punch holder relative to the pipe for cutting the notch in the pipe;

a means to hold the pipe relative to said means to slidably support said punch holder; and said punch positionable within a circumference matching an arcuate surface formed in an upper surface of said means to hold the pipe, said lateral cutting portions of said first and second cutting edges each are an angled facet that is generally coplanar with respective said diagonal slopes of said punch holder when facing upwardly and abutting said diagonal slopes.

14. The tool of claim 13 wherein said means to hold said punch in two distinct orientations includes a recess with an arched surface defined by said arch and having a contour matching a contour of portions of both said first cutting edge of said punch and said second cutting edge of said punch, such that said arched surface is adapted to abut said second cutting edge when said first cutting edge is oriented for cutting the pipe and said arched surface is adapted to abut said first cutting edge when said second cutting edge of said punch is oriented for cutting the pipe.

15. The tool of claim 14 wherein said angled facets of said punch are each spaced apart by either a top flat on said punch or a bottom flat on said punch, said flats joining each said angled facets together, said top flat located spaced below said apex by a gap when said angled facets adjacent said top flat are located abutting said diagonal slopes of said arched surface; and wherein a width of said punch is less than a width of said recess in said punch holder, such that side gaps are provided between sides of said recess in said punch holder below said diagonal slopes of said recess and sides of said punch.

16. The tool of claim 13 wherein said means to slidably support said punch holder relative to the pipe includes a collar, said collar including side walls spaced from each other by a distance similar to a width of said punch holder.

* * * * *